United States Patent [19]
Tschirky

[11] 3,894,818
[45] July 15, 1975

[54] IN-HOLE MOTORS

[75] Inventor: John E. Tschirky, Long Beach, Calif.

[73] Assignee: Smith International, Inc., Newport Beach, Calif.

[22] Filed: Apr. 27, 1973

[21] Appl. No.: 354,954

[52] U.S. Cl. ............... 418/48; 418/181; 175/107; 308/187; 308/230
[51] Int. Cl. ......... F01c 1/10; E21b 3/12; F16c 1/24
[58] Field of Search ...... 418/48, 181; 175/107, 228; 415/502; 308/8.2, 187, 230

[56] References Cited
UNITED STATES PATENTS

| | | | |
|---|---|---|---|
| 1,232,800 | 7/1917 | Hess | 308/230 |
| 2,644,671 | 7/1953 | Ingram | 308/8.2 |
| 3,149,685 | 9/1964 | Mitchell et al. | 175/107 |
| 3,365,202 | 1/1968 | Carleton | 175/107 |
| 3,456,746 | 7/1969 | Garrison et al. | 175/107 |
| 3,807,513 | 4/1974 | Kern et al. | 175/107 |

FOREIGN PATENTS OR APPLICATIONS 781,860   8/1957   United Kingdom............. 415/502

*Primary Examiner*—John J. Vrablik

[57] ABSTRACT

This invention relates to in-hole motors in which thrust bearings are provided with means to lubricate the bearings employing pressure balanced seals. The preferred embodiment includes the application of such sealed bearings to progressing cavity motors for use in drilling operations.

12 Claims, 11 Drawing Figures

IN-HOLE MOTORS

BACKGROUND OF THE INVENTION

The use of fluid motors in bore hole drilling especially drilling for oil and gas but also in mining operations, has been a standard procedure in the art. Such motors are employed to rotate drills for boring in the earth both for forming a bore hole and also for coring. The motors are also useful in oil field operations such as tube cleaning, milling operations, cementing, cement drilling and other operations where it is desired to rotate a rod at the end of which a tool is to be rotated. I refer to such motors as fluid motors and when designed to be run at the end of a pipe and adjacent to the tool as an in-hole motor. In the usual case the rotor of the motor and the drill bit rotate with respect to stator which in turn is connected to a conventional drill string composed, in the case of the drilling of well bores, of a "kelly" drill pipe and drill collar as required. This string extends to the surface with the kelly mounted in the rotary table. The usual is liquid or gas fluid and the liquid, in case of in-hole motors used in drilling is the drilling fluid, i.e. mud, or gas which serves its usual function in the drilling operation returning to the surface carrying cuttings resulting from the drilling operation. However, in this combination the circulating mud has an additional function and that is to supply the hydraulic power to operate the hydraulic motor.

One of the primary problems resides in the design of the bearing system which will permit operations for periods of economic length.

It is one of the primary advantages of the in-hole motor drills, as compared to conventional rotary drilling operations, that the stresses in and the wear on and sometimes the failure of drill pipe encountered are avoided. The drill pipe is either held stationary or rotated at a slow rate as compared to the rate of rotation of a drill pipe in rotary drilling. The winding up of the drill pipe and the rubbing against the bore hole are thus not present when using the in-hole motor. Furthermore, since the drill pipe is not rotated at the speeds usual in rotary drilling, the in-hole motor is required to produce a much lower horse power than is applied by the rotary table at the surface in order to produce the relatively same horse power at the bit. It also provides increased penetration rates (in most cases), when compared to rotary drilling. The main reason is increased bit r.p.m. It also permits better control of the direction of the hole as the drill progresses. One of the problems both in the case of rotary drilling and in-hole motor drilling is in the cost of the "round trip", that is the periodic uncoupling of the drill pipe during its removal and the re-introduction of the drill pipe and drilling into the hole. The primary cause for the round trip, at least in straight hole drilling, is a wearing out of the bit. Improvements in drills have increased the length of the life of the drill bit. In the case of directional drilling where the axis of the hole is directed in a chosen compass direction and at a selected vertical angle, as in directional oil well drilling operations and in mining operations, it is desirable that the drill be capable of functioning for periods of time comparable with that encountered in like drilling by the rotary method with modern type drills.

The in-hole motors must meet the competition of rotary drilling for the above uses. They should themselves be capable of functioning effectively as long as the drill bits function effectively.

One of the primary limitations in the case of the in-hole motors, employing water based or oil based muds, which carry solid particles which impart viscosity and other desirable properties such as density, is the erosion of the bearings. As is usual this mud is circulated under pressure sufficient to overcome the pressure drop due to flow resistance of the drill stem above the motor, provide the hydraulic power required to operate the motor and turn the drill bit at the required torque, (mechanical bit horsepower), and have sufficient residual energy to pass through the nozzles and to carry the detritus to the surface. At the surface it is conventional to screen or otherwise remove the detritus termed cuttings and sand and hopefully as completely as possible without removing the other solid materials which are required to impart the desired properties to the mud. The result is a compromise with the circulating mud having some sand in it.

Another and severe wear of the bearings results from the pounding that is imposed on the bearings. The drill as its drills into the earth is, in oil country parlance, "dancing" in a percussive fashion. The drill is subjected to random and repeated high frequency reciprocal movement in the hole resulting from a number of forces. In using roller bits with deep teeth, as the drill rotates its rolls off the high point of one tooth into the valley between adjacent teeth, resulting in a vertical reciprocal motion. As the bit rolls off one of the teeth, it moves away from the bearing housing in which it is mounted so that it may move down in the bearings. The bearing housing which is highly loaded, for example, from 10–40,000 lbs. due to the drill collar, pounds down on the bearings. Furthermore, unevenness in the hardness of the formations at the various points at the bottom of the hole will permit the bit to dig faster on one side of the hole than on the other, creating ledges which break off and the bit drops. The housing follows pounding the bearings.

Another cause of impact or percussion load is the repeated winding up and unwinding of the drill pipe which shortens due to the holding or slow rotation of the drill string at the surface. With in-hole motors there is a counter torque which tends to rotate the drill string counter clockwise contra to the clockwise rotation of the rotor and bit. In order to overcome this counter torque it is usual and necessary to impose a restraining torque on the drill string. This is done either by holding the drill string still or imparting a rotation of the drill string by a slow rotation of the "rotary table". It is desirable and in practice usual to rotate the drill string at a sufficient revolution per minute in order to be assured that the drill string will not stick in the hole and will move freely. This rotation although slow compared to the rate of rotation usually used in rotary drilling is still sufficient to wind up the string, due to its length to radius ratio which results in a string of substantially no rigidity. The winding up of the drill string results in a shortening of the drill string of substantial proportions when there is a substantial torque applied at the drill bit. If the drill bit torque reduces as a result of freer rotation, i.e. the less resistance at the bottom to the rotation of the drill bit, the drill string will unwind increasing in length and pounding down on the bearings. The result is a short life and is one of the serious limitations of the economic advantage which the in-hole drill has with respect to rotary drilling.

THE PRIOR ART'S SOLUTIONS OF THE PROBLEM

Methods for sealing and lubricating bearings to protect them from the erosive fluid have been suggested and have in the past failed. To protect the bearings against erosion, rubber coated thrust plates have been used as thrust bearings and have been employed but impart a high frictional load. Seals for roller and ball bearings have failed due to the high pressure drops across the seals and the erosion of the seals and bearings and the pounding of the bearings described above. Consequently it has been conventional to employ bearings without seals and to rely on a part of the circulating mud to pass through the bearings to lubricate them. Such bearing systems are shown in E. P. Garrison et al., U.S. Pat. No. 3,456,746 patented July 22, 1969. The art has been required to accept the erosion and pounding of the thrust bearings which result in the limited life of the bearings. At least in the case of deviated holes, where more frequent round trips are required as compared to straight hole drilling, this short bearing life is tolerable and the bearings may be readily exchanged. For straight hole drilling the more frequent round trips are a serious limitation on the use of in-hole motors.

STATEMENT OF THE INVENTION

I have solved the several problems of the prior art as set by several improvements each of which severally add to the utility of the in-hole drills of the conventional type and which when used together co-operate in producing an in-hole drill which will largely increase the useful life of the bearings so that they will more nearly match the useful life of the drill, i.e. will be useful at least as long as the bit. One of these improvements includes provision of means for limiting the hydraulic pressure drop across the seals, in a sealed bearing combination, while permitting the required pressure drop across the motor to deliver the necessary hydraulic power to the drive shaft and to the bit and the pressure drop required at the nozzle of the bit for increased penetration rates and at the bottom of the hole to return the cuttings to the surface.

This is accomplished in my invention by balancing the pressure at the exit from the motor and above the seal to the annulus pressure that is the ambient pressure. I provided a restricted passageway which drops the high pressure at the exit of the motor to the exterior of the housing, i.e. the annulus, through a vent orifice in the housing. The restricted passageway acts as a flow restricting device to limit the quantity of by-pass liquid through the vent orifice. The limitation of the quantity of by-pass fluid results from the drop in pressure across the restricted passageway and volumetric capacity of the restricted passageway. The quantity of the by-pass fluid is limited to a minor fraction of the total circulating fluid, enough merely to substantially vent the pressure in the housing above the sealed bearings to the annulus pressure in the ambient environment at the vent. I so provide for locating a vent to the annulus in the housing above the bearing system. The restricted passageway may be positioned in a radial bearing of sufficient hardness to resist the erosive action of the mud.

The thrust bearing assembly is composed of two major parts, an upper bearing assembly which supports the rotor and the drive shaft when the load is not on the bit, and the lower bearing which is loaded when the bit is loaded and the upper bearing is unloaded. I provide a seal preferably at both ends of the bearing chamber which includes the upper and the lower bearings and which is filled with a lubricating medium under pressure substantially equal to the pressure of the annulus. The result of this arrangement is that the pressure drop across the seals and across the bearings is for practical purposes substantially nil.

A further improvement but which need not be used with the seals or the vent described above and which may be applied to prior art bearing designs is to employ the above flow restricting device to limit the amount of fluid which flows through the bearings. It also acts as a radial bearing for the drive shaft as described above.

A further improvement which adds to the life of the bearings of the motor in the combination of my invention but which would also improve the life of the bearings of the prior art in-hole drill motors is in the design of the thrust bearings whereby they are spring loaded under a load which need not be more than necessary to keep the bearing parts in contact against separation when the rotor and stator are moved axially of the housing relative to each other with no load on the bit.

During drilling operation the springs act as shock absorbers and by preventing separation of the races and balls limit impact loading. Additionally it prevents displacement of the balls and races especially when the tool is laid down. Thus preventing the loss of balls from the races, where as is usual in this art ball cages are not used.

When applied to bearing designs which have been used with in-hole drill motors, the provision of the spring loading has a particular utility when applied to bearings used as in the prior art without seals. Since the balls and races are kept in contact with each other in the design of my invention under a load sufficient to hold them snug, it will prevent the intrusion of fluid between the balls and the races at their areas of contact and thus limit the erosion of the bearings of the races where the tool is laid. This property is also useful in the case where the bearings are sealed so that if the seal should fail the bearings may still operate without being destroyed.

A further improvement which is applicable to other types of bearings is the use of tandem series of bearings. The thrust load is thus divided so that each bearing carries a fraction of the total thrust load, especially when under drilling load.

The above inventions may be usefully applied to any motor when used as an in-hole drill motor, for example, an electrical motor, a turbine or a progressing cavity motor, which are in principle those described in the article by H. M. Rollins, "Bit Guiding Tools Provide Better Control of Directional Drills", World Oil, June 1966, p. 124–135. Instead of the motor referred to in that article as "turbodrill" I prefer to use progressing cavity motor referred to in that article as being distributed by Smith International Corporation under the Registered Trademark, "Dyna-Drill" and see also the Clark U.S. Pat. No. 3,112,801 patented Dec. 3, 1963. The preferred in-hole progressing cavity motor is more fully described below. I prefer employ or fluid motor such as gas or steam. In our presently preferred embodiment we prefer to employ the drilling mud as the hydraulic fluid. Such motorized drills are herein referred to as in-hole fluid motor drills, these include a turbine, and where the motor is a progressing cavity motor based on the principles of the motor as described herein, I refer to the motor as a progressing cavity hydraulic motor.

DETAILED DESCRIPTION

This invention will be further described by reference to the drawings of which:

Figure 1:
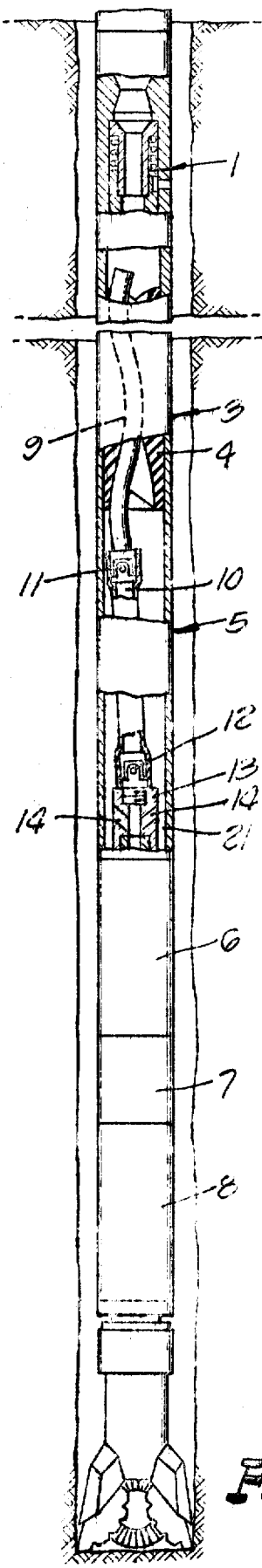
FIG. 1 is a somewhat schematic partial section of a motor assembly to which my invention may be applied.
Figure 5:
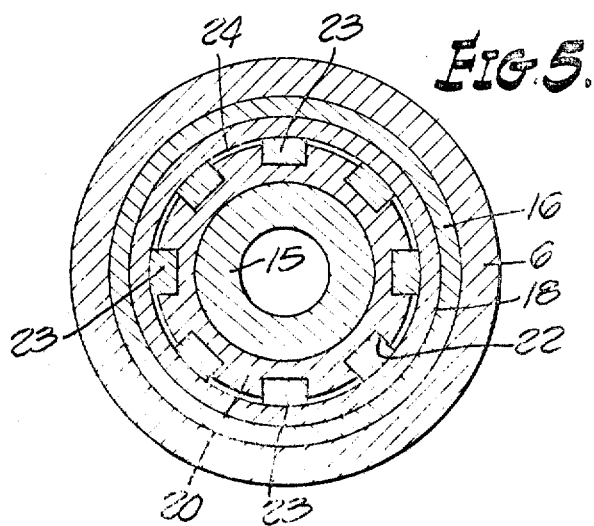
FIG. 5 is a section taken along the line 5—5 FIG. 2A also FIGS. 3 and 4.
Figure 6:
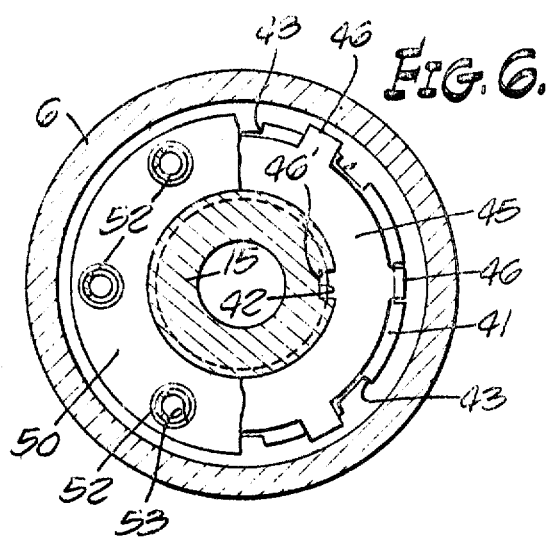
FIG. 6 is a section taken on line 6—6 FIG. 2A also FIGS. 3 and 4.
Figure 7:
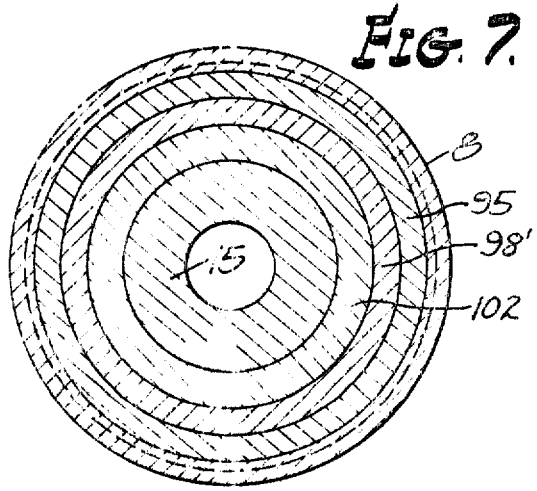
FIG. 7 is a section taken on line 7—7 FIG. 2B and also FIG. 4.

In FIG. 1 the by-pass valve assembly 1 is of conventional design and is positioned below the drill collar or the "Bent Sub", or the "Magnetic collar" of a conventional oil well drill string. An example is shown in the Clark et al. U.S. Pat. No. 3,005,507 patented Oct. 24, 1961. Since this valve forms no part of this invention and illustrates merely a conventional piece of equipment useful with systems such as the motor shown in FIG. 1, no further description is necessary.

A conventional drill string including the drill collar which imposes the weight on the drill bit may be connected to the by-pass valve by the usual pin and box. The drill collar and the drill pipe extend to the surface and pass through a rotary table by means of the usual kelly.

THE MOTOR ASSEMBLY

The motor shown in FIG. 1 is a progressing cavity motor. The motor housing 3 (See FIG. 1) is connected to the by-pass assembly 1. The motor housing 3 carries a stator 4 bonded to the interior surface of the housing 3. The connecting rod assembly housing 5 is connected to the housing 3 and the bearing housing. The drive shaft assembly housings 6, 7 and 8 carry the seals and bearing and lubricator assemblies. The housing 6 is connected by a pin and box connection to the housing 5 and to the housing 7 which carries a lubricating chamber and to the lower drive shaft bearing assembly housing 8 all to be more fully described below.

The rotor 9, mounted inside the stator 4, at its lower end is connected to the connecting rod 10 by a universal joint 11 and to the tubular drive shaft 15 through the drive shaft cap 13 connected to the connecting rod by a like universal joint 12.

The universal joint may be one such as described in the Neilson et al. U.S. Pat. No. 3,260,318 patented July 12, 1966 or to the Neilson et al. U.S. Pat. No. 3,260,069 patented July 12, 1966.

The connecting rod and universal joints may be enclosed in a flexible cover to protect them from erosion by the mud, and to contain the lubricant inside the connecting rod assembly.

Figures 2A, 2B:
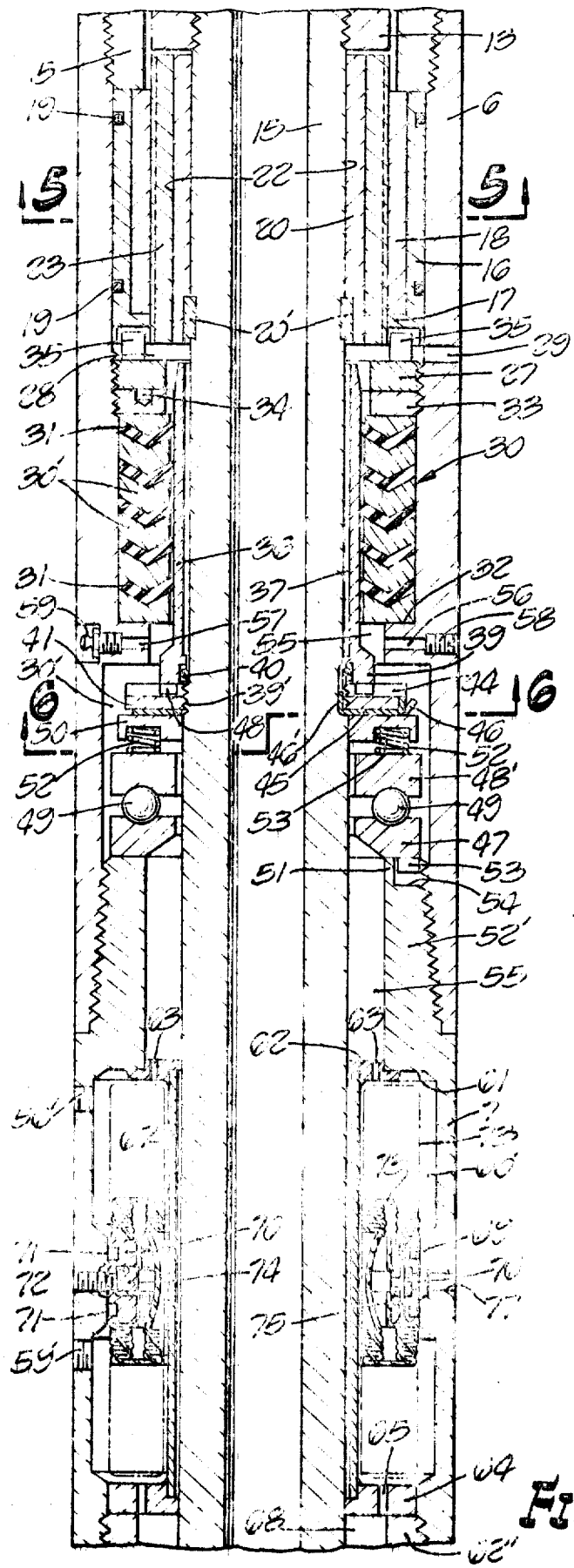
FIGS. 2A and 2B are a vertical section of that portion of the motor such as is shown in FIG. 1 taken through the portion of the tool below the end of the connecting rod.

The progressing cavity motor shown is of the helicoidal type. The outer body of the motor that is the stator is composed of an elastomer, for example, a rubberlike compound, which creates a spiral cavity throughout its length to provide a double spiral groove. The passage of fluid through the stator 4 and past the rotor along its length causes a rotation of the rotor and a movement of the rotor from side to side creating eccentric rotation at the end of the rotor where it is connected to the connecting rod. Because of the universal joints the eccentric motion is converted into a true rotary motion (concentric) at the drive shaft 15. The fluid as it exits the stator passes through the connecting rod housing 5, around the connecting rod and drive shaft cap 13 through by-pass annulus 21. The connector 13 is provided with orifices 14 (See FIGS. 1 and 2A). At this point the mud is under very high pressure and passes in considerable volume from the exit of the stator.

As an aid to the understanding of the importance of the various features of my invention it may be helpful to visualize the order of magnitude of the hydraulic forces which are involved. For example and not as a limitation of my invention, the required pressure at the exit of the stator may be, depending on the depth of the bore hole, in the order of 500 to 1500 per pounds per square inch. This is the differential pressure at the bit nozzle. Such pressures are required in order to have the required velocity and fluid volume rate through the bit nozzles in order that there will be the necessary pressure and volume of fluid at the bottom of the hole for better hydraulic and bit cutting action, and to return the cuttings to the surface.

Such a flow of fluid at the pressures indicated would erode the bearings in short order to make the tool impractical. As indicated above prior art has provided means to by-pass the fluid through the bearings in order to lubricate the bearings and has provided means to limit the flow of fluid which passes through the bearings so that sufficient flow would be provided at the drill bit nozzles. However, the pressure drop as well as the volume of flow through the bearings in the prior art resulted in relatively rapid bearing wear and erosion. The Garrison U.S. Pats. No. 3,489,231 patented Jan. 13, 1970 and No. 3,456,476, patented July 22, 1969 illustrate such flow restrictor bearing assemblies.

THE FLOW RESTRICTOR AND ROTARY BEARING ASSEMBLY

The flow restrictor described herein is the joint invention of myself and Gary Monroe Crase and is described in the copending application Ser. No. 388,586, filed Aug. 15, 1973 is combined with a rotary bearing and is designed so that it will act to minimize the entry of sand or other abrasive particles and fluid into the seals. It acts as a rotary bearing as well as a flow restrictor.

The flow restricting rotary bearing acts in cooperation with a vent orifice at the exit of the flow restrictor which vents the exit pressure to ambient pressure in the annulus. The pressure drop across the seal and bearings is thus reduced to an amount which in practical effect would be zero even if, as a result of any accidental failure in the seal system, a flow path for the fluid, discharging from the flow restrictor through the end of the tool beyond the bearings, is provided. This is because the pressure at the entrance to the seal system is the ambient pressure that is the pressure in the annulus around the tool in the bore hole. This pressure is balanced in my preferred embodiment by exerting a hydraulic pressure at the exit of the seal by means of a lubricant which is held under pressure substantially equal to the ambient pressure.

The rotary bearing flow restrictor assembly is composed of a steel sleeve 16 ending in an internal flange 17 which is positioned in housing 6 and sealed against the wall of 6 by the "O" rings 19. A tungsten carbide sleeve 18 is positioned, as by a shrink fit, on the interior surface of the sleeve 16 so as to abut the flange 17. The ends of the sleeves 16 and 18 are held against the end of the pin end of 5. The complimentary rotating portion of the rotary bearing includes a steel sleeve 20 which is keyed at 20' to the drive shaft 15. The sleeve 20 is spaced between the drive shaft cap 13 into which the tubular drive shaft 15 is threaded, and the key 20' so as not, to shoulder against the end of 13 (See FIG. 2A).

The external diameter of the sleeve 20 is somewhat less than the internal diameter of the sleeve 18. The sleeve 20 is provided with a plurality of circumambiently disposed grooves 22 into which are fitted tungsten carbide rods 23 of suitable cross section, for example, rectangular cross section. They are fitted into and held in the grooves 22 as by soldering or other suitable means. The rods extend the length of the sleeve 20. The external surface of the rods 23 is arcuate so as to be concentric with the interior surface of the tungsten carbide cylinder 18 thus forming a rubbing fit.

Because of the slightly different internal diameters of the steel sleeve 18 and external diameter of the sleeve 20 an interrupted annular space 24 is provided extending between the rods 23. This forms a fluid passageway from the outlet of the stator around the drive shaft cap 13 and through the annulus 21 and passageways 24. The end flange 17 is formed with a ring 25 spaced from the outer surface of 16. The ring 25 is provided with diametrically opposed slots 26 (See FIG. 8). The nut 27 is spaced from the end of 23 and 26 to provide an annular channel 28. Positioned in the housing 6 at the channel 28 is a vent orifice 29.

As will be observed the discharge of fluid from the restricted passageways 24 enters the annulus 28 and discharges through 29 into the ambient environment in the annulus. In a bore hole it will be the annulus of the bore hole between the wall of the bore hole and the drill string.

The restricted passageway 24 and the passageway 28 which communicates with the vent 29 are designed to permit a reduction in pressure through 29 at ambient pressure, to bypass, for example, less than about 10% of the fluid exiting through the stator.

Figure 3:
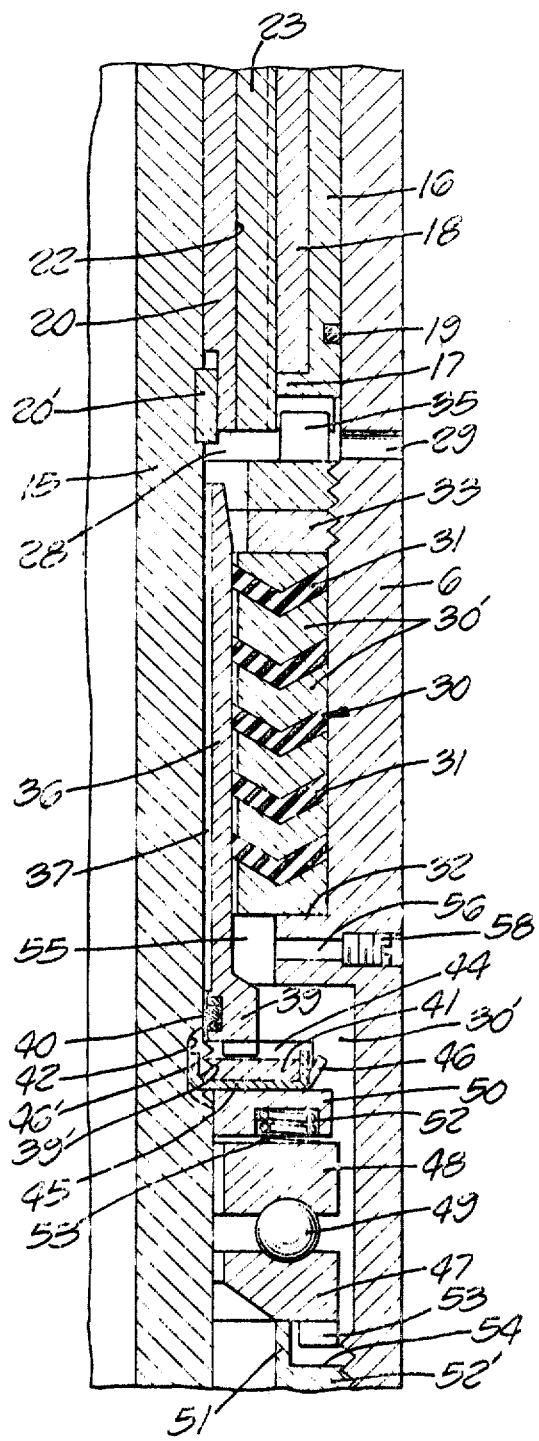
FIGS. 3 and 4 are enlarged sectional views of the tool as shown in FIG. 2A.
Figure 8:
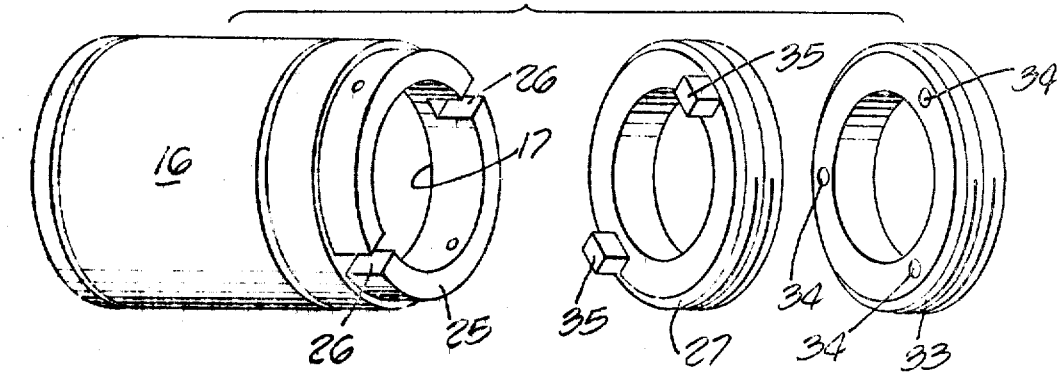
FIGS. 8, 9 and 10 are perspective exploded views of details of parts shown on FIGS. 2A, 3 and 4.
Figure 9:
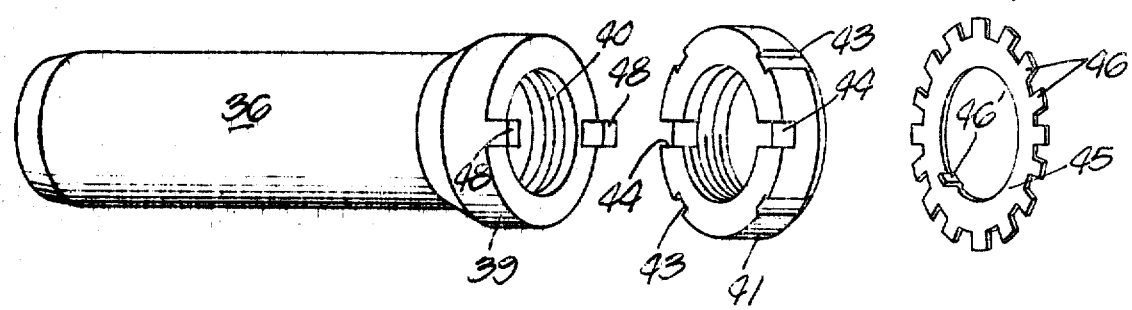

As will be seen the tungsten carbide sleeve 18 is a stationary member of the rotary bearing being mounted on the stationary housing and held against rotation by the dogs 35 (See FIGS. 3 and 8). The rotary member of the radial bearing is the sleeve 20 keyed to the tubular shaft 15. The contiguous surfaces of 18 and the rods 23 form rubbing surfaces suitably smooth and thus act to force the fluid and contained solids through the passageways and out through the vent. The use of tungsten carbide or other material of similar hardness which exceeds the hardness of sand will preserve the rubbing surfaces against wear, erosion, scratching and deformation which may impair the utility of the rotary bearing restrictor. The frictional load is minimized by the fact that the surfaces are continually wetted as the interrupted annular arcuate passageways 24 sweep over the inner surface of 18.

Instead of tungsten carbide I may use other materials such as ceramics for example alumina and the nitrides or borides provided they have the impact resistance, hardness, tensile strength as well as a Young's modulus suitable to serve in the place of tungsten carbide and particularly have a scratch value to resist the sand and the mud as will be recognized by those skilled in this art.

THE SEAL ASSEMBLY

The packing gland 30 of the seal assembly is composed of a plurality of superposed metallic rings 30' and fibrous Chevron seals member 31 held between the rings. The seal assembly is seated on an internal shoulder 32 of the housing 6. The rings 30' are of an internal diameter greater than the external diameter of the sleeve 36. The internal nut 33 carrying wrench bores 34 (See FIGS. 3 and 8) is screwed down to compress the Chevron seals tightly between the rings 30'. The lock nut 27 is threaded to lock the nut 33 into position with the dogs 35 entering the notches 26.

The seal assembly includes the floating sleeve 36 which extends the length of the packing gland and is spaced at 37 from the outer surface of the tubular drive shaft 15. The Chevron packing abuts the external surface of the floating sleeve 36 and the internal surface of the housing 6. The end of the sleeve 36 extends to the annular space 28. The lower enlarged end 39 is sealed by O ring 40. The nut 41 is threaded on to the tubular shaft 15 which carries a vertical groove 42 interrupting the external threads. The nut carrying diametrically opposed notches 43 and circumferentially spaced surface grooves 44, is screwed at 39' on the tubular drive shaft 15. It is held against unthreading by the lock washer 45 carrying a plurality of extending fingers 46 circumferentially spaced above the washer and a vertical finger 46'. The finger 46' is placed in the groove 42 and the fingers 46 are bent upward into the notches 43 in number equal to the notches. The remaining fingers 46 remain unbent.

The sleeve 39 is mounted at the end for rotation with the shaft 15 by the dogs 48 which enter in notches 44. The free end of the sleeve in the annular space 28 and the annulus 37 permits the sleeve to have transverse adjustability to hold a good seal at the O ring 40 and the Chevron packing notwithstanding any unbalanced load which causes the drive shaft to whip as a result of unbalanced transverse loading communicated from the random loading of the drive shaft by the drill bit. As will be described below the seal between the sleeves 36 is maintained during the movement of the sleeve relative to the seal 30, when the drive shaft is moved axially with respect of the housing, since the flexible Chevron seal rings 31 remain in sealing contact with sleeve 36.

THE UPPER BEARING ASSEMBLY

The upper bearing assembly composed of the races 48' and 47 and ball 49 together with the pressure plate 50 and associated springs 52 set in the spring retaining bores 53 form the upper bearing assembly. The assembly supports the weight of the rotor connecting rod and drive shaft and drill bit when the bit is raised off bottom by means of the drilling line conventionally used in oil well drilling. In the form shown at FIGS. 3 and 4 the tool is in position as it would be with a load imposed on the bit by the drill string including the housings 5, 6, 7 and 8 through the medium of the drive shaft as will be more fully described below.

Attention is drawn to the provision of clearance between the end of the dive shaft cap 13 (See FIG. 2) and the rotary bearings sleeve 18 and rods 23 and the provision of annulus 28. Clearance is also provided between the top of the dogs 35 and the bottom of the internal flange 17. The purpose of these clearances will be further described below.

The nut 41 exerts pressure on plate 50 to load the springs 52 and the bearings so that when they carry only the weight of the rotor, connecting rod, and drill bit when the bit is in off bottom position, the whole load is on the bearing assembly 47, 48' and 49, and the springs are loaded in compression to hold the races 48' and 47 snugly against the balls 49. The race 47 is positioned atop of the end 51 of the pin 52' of the housing 7. The dog 53 integrally formed with the race 47 fits into an end-notch 54 positioned in the end 51.

THE LUBRICATION ASSEMBLY

The lubricator housing 7 is connected via pin 52' to the box end of the housing 6 providing an annular space 55 beneath the lower race 47 which communicates with the free space in the upper bearing assembly, that is the annulus between the races and the drive shaft 15, and the spaces between the spaced balls in the position between the races 48' and 47, a number which is provided in a conventional manner. The free space above the bearing assembly includes the clearance space 30' and the annulus 37. The shoulder 32 is bored at 56 and 57 to provide communication between space 55 and the exterior of the housing 7 when the plug 58 and the pressure valve 59 are removed.

Below the pin 52', the housing 7 has an enlarged internal diameter providing a space 60' underneath the internal shoulder 61 against which is seated a plate 62 carrying bores 63. A sleeve 67 is welded to plate 62. A lower plate 64 is positioned on the top of the pin 62' of the lower bearing housing 8 and carrying bores 65. Positioned between the plates 64 and 62 is a sleeve 67 which is spaced from the drive shaft 15 forming an enclosure 60' which communicates through the bores 63 with the annulus 55 and through bores 65 with the annular space 68 between the pin 62' and the drive shaft. Communications is also provided between the space above plate 62 and below the plates 64 through the annulus between sleeve 67 and the shaft 15.

Positioned in the internal wall of the housing 7, intermediate between the plates 64 and 62 is a circular boss 69. The bellows ring 70 sealed against the internal wall of the boss 69 by the O rings 71 is held in position by a series of spaced set screws 72 circumferentially positioned about the housing 7 and flush with the outer surface thereof.

The bellows 73 is held in the ring 70 by the wedge ring 74 and secured by a plurality of circumferential spaced screws 75. The ring is bored at 76 to provide a communication with 77 positioned in the housing 7 and in registry with the bore 76. The bellows assembly 73 including the ring 70 is a commercial item available on the general market and needs no further description. The bellows is modified by provision of the bore hole 76 and the seats for the screws 72. Any bellows or bag or any other expandable container that will function in a similar manner will be suitable for the purposes of my invention. However, a bellows employed in the herein combination, which communicates with the exterior of the housing, has a particular useful function in the combination with the bearings assembly and seal assembly described above as will be more fully set forth below.

LOWER BEARING ASSEMBLY

The housing 8 below the pin 62 is of enlarged diameter ending in a beveled shoulder against which is positioned the load plate 110. The races 111, 112 and 113 and balls 114 form an upper tandem bearing assembly. This assembly is supported on the retaining ring 115 positioned in groove 119 of the drive shaft 15.

The lowermost race 113 is locked in position on the drive shaft 15 by means of a lock washer 116 of construction similar to the lock washer 45, with fingers bent up to enter notches 117 in the outer surface of race 113 and the internal finger 118 set in a receiving groove 120 in the shaft 15 in a manner similar to the lock washer assembly 41. The Bellevill spring 121 is positioned between the race 111 and the load transmitting pressure plate 110 seated against the beveled shoulder 109.

A similar bearing assembly is provided, composed of races 81, 82 and 83 and balls 84 forming a second set of tandem bearings. The lowest race 83 is supported on the retaining ring 85.

The lower race is locked in position on the drive shaft by means of a lock washer 86 similar to lock washer 45. The internal finger is positioned in the groove 87' and the external fingers in the circumferentially spaced end notches 88'. The pressure plate 89 is seated against the internal shoulder 90' with the Belleville spring 91' positioned in between the pressure load transmitting plate 89 and the upper race 81.

Similar arrangements is provided in connection with the lowest tandem bearing assembly composed of the races 130, 131 and 132 and balls 133. Race 132 has a plurality of circumambiently arranged notches 134. The lock washer 135 has a structure similar to the structure of the lock washer 45. The external fingers of the lock washer are bent up into the notches 134 spaced about the circumference of the race 132. The internal finger being bent up into the groove 136 in the manner similar to that described in connection with the lock washer 45. The load transmitting plate 96 is positioned underneath the internal ledge 97 and between the plate 96 and the upper race 130 is positioned another Belleville spring 98.

THE END RADIAL BEARING ASSEMBLY

The spacer sleeve 99 sealed by O ring 100 is positioned on the drive shaft 15 and abuts underneath the lock washer 135. The radial bearing flow restrictor assembly 95 carries radial seals 96' which seal against the inner surface of the end flange 97 and the spacer 99. Two concentric and contiguous cylinders formed of hard materials such as tungsten carbide or other material similar to the radial bearings 18 are positioned in the assembly 95 to form a radial bearing. The outer tungsten carbide cylinder 98' sealed against the inner surface of 95 and by O rings and held in position by retaining ring 99' and stop screw 100' which enters the notch 101.

Figure 10:
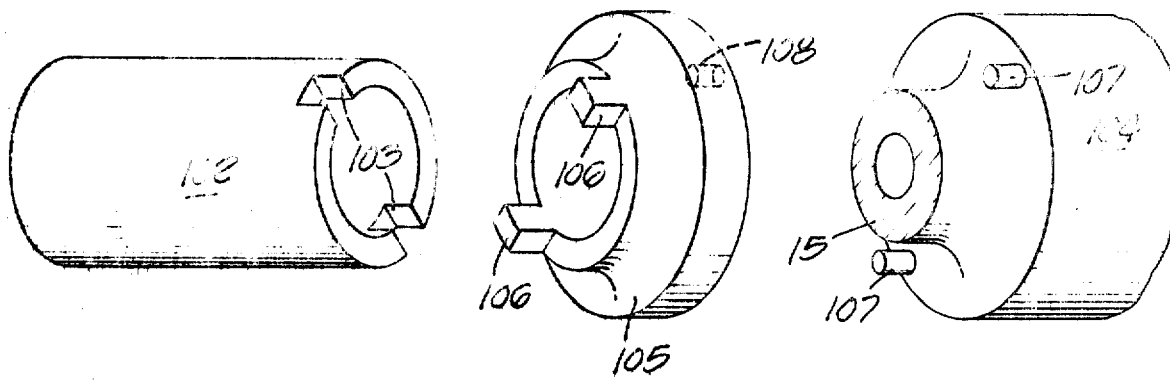

The complimentary tungsten carbide sleeve 102 is mounted on the surface of the drive shaft 15 to be positioned underneath the spacer 99. The end of the sleeve 102 carries notches 103 (See FIG. 10).

The tungsten carbide cylinders are polished and form a sliding fit. The sleeve 102 is locked to the shaft and the sleeve 98' is locked to 95.

The drill bit box 104 which is formed integrally with the drive shaft 15 at the end thereof. The box carries a fitting of 105 which has dogs 106 diametrically arranged which are adapted to fit into the notches 103 (See FIG. 10). The fitting 105 is located on the drill bit box shoulder 104' by pins 107 positioned in the box 104 and by entry into the bores 108.

Figure 4:
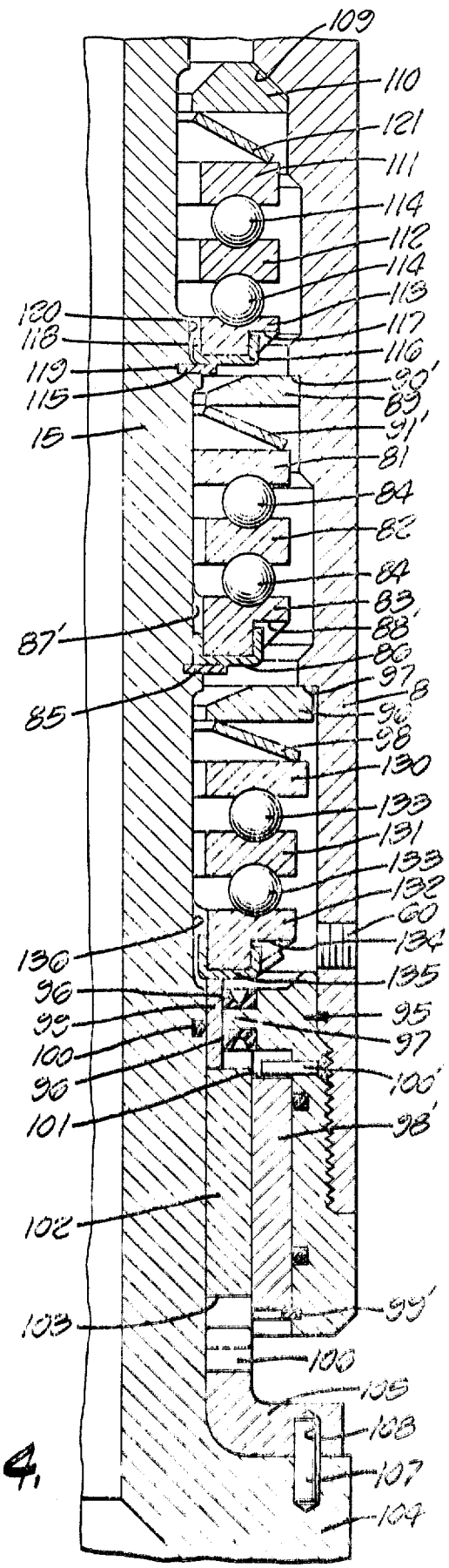

The assembly as shown in FIGS. 3 and 4 shows the parts with a load on the lower bearing as if the weight of the drill string was on the bit as in drilling position. In that case the dogs 35 are entered into the slots 26 but spaced from the flange 17. The nut 41 is spaced from the lower surface of internal ledge 32. The springs 52 are only partially compressed. The dogs 48 have entered partially into the notches 44. The load transmitted to plates 100, 89 and 96 has partially compressed the Belleville springs and the dogs 106 have entered and seated into notches 103.

ASSEMBLY OF THE TOOL

The shaft is threaded to receive the drive shaft cap 13. It is formed with a key way to receive the key 20' and threaded at 39' to receive the nut 41 and grooved at 46' and reduced in diameter to produce the bossages to receive the grooves for the retaining rings and lock nuts for the lower bearing assembly.

The fitting 105 is slid over the shaft and entered into position with the pins 107 positioned in the bores 108 on the bit box 104.

The carbide sleeve 102 is passed over the top of the shaft and slid into position with the dogs 106 entering the notches 103. The spacer sleeve 99 is slid over the shaft to abut the pre-positioned sleeve 102 at the O ring 100. The pre-assembled assembly 95 is slid over the top of the shaft into position with the seals 96' positioned at the sleeve 102. The sleeve 98 slides over the sleeve 102.

The lower bearing is then assembled on the shaft. The race 132 which has notches 134 is assembled with the lock washer 135 and slid over the shaft until the upright finger enters the notch 136. The lock washer, similar to the sheet metal lock washer 45, is seated on a spacer sleeve 99. Enough clearance is provided between the drive shaft and the race 132, so that together with the resilience of the sheet metal lock washer 135 the assembly may pass over the shaft and permit the upright finger of the washer to enter into the notch 136. The races 131, 130, Belleville spring 98 and pressure plate 96 are passed over the shaft and assembled with the balls 133. The internal diameter of the races, Belleville spring and pressure plate is large enough to pass over the shaft. The reduction of the shaft diameter between the bossages at the lowest bearing assembly provides an annular space between the races, Belleville spring and pressure plate and the shaft surface adjacent thereto.

The retaining ring 85 is assembled into the receiving groove on the shaft and the lock washer 86 assembled with the race 83 and mounted on the shaft similarly to that described in connection with the race 132. The Races 82, 81 and the balls 84, the Belleville springs 91' and the pressure plate 89 are assembled. As indicated the parts have internal diameters which permit this assembly and provide the annular spaces between the races and the shaft similarly to that described for the lowest race assembly.

The uppermost tandem assembly retaining ring 115 is mounted in its receiving groove 119 and the lock washer 116 and lower race 113 are assembled similarly to race 83, and mounted so that the upright finger 118 of the lock washer enters the receiving groove 120. The races 112 and 111, and the balls 114 are positioned together with the Belleville spring 121 and the pressure plate 110.

An annulus is thus so provided between the races and the adjacent shaft and between the pressure plates and the adjacent shaft. Attention is drawn to the fact that the outer diameters of the races, Belleville spring and pressure plates are progressively smaller from the lowest tandem bearing assembly to the uppermost of the three tandem assemblies shown. The purpose of this design is to permit the housing 8 to be passed over the bearing assemblies and screwed on to the fitting 95'. This seats the pressure plate 110 against the shoulder 109 and seats the pressure plate 89 against the shoulder 90' and the pressure plate 96 against the shoulder 97.

The assembly of the unit which is to be positioned in housing 7 may follow one of several procedures. For example, the housing 7 is first entered by the plate 62 which is welded to sleeve 67, and then moved in position to seat against the shoulder 61. The annular bellows 73 are assembled through the box end of the housing, i.e. the end which is screwed on to pin 62, until it is pushed into registry with the boss 69 so that the bore 77 is in registry with the bore 76 in the ring and in registry with the set screw 72 thus positioning the O rings 71. The screws are then entered to lock the bellows in position. Then the plate 64 is moved into position to abut the sleeve 67. The assembled housing 7 is then passed over the shaft 15 and screwed onto pin 62.

The assembly of the upper bearing is accomplished, as will be readily observed, by passing the race 47 over the shaft until the dog 53 enters the notch 54 and is seated on the end of the pin 52'. The balls and race 48 are then passed over the shaft and the spring 52 enter the spring receiving bores 53 in the plate 50, are then entered over the shaft. The lock washer 45 is then assembled with the nut 41 and passed over the end of the shaft and screwed onto the shaft with the finger 42 in the receiving notch, to partially compress the springs 52. The sleeve 36 is passed over the shaft with the O ring 40 in position, the dogs 48 entering the notches 44.

The housing 6 is then assembled by entering the packing gland 30 onto the internal shoulder 32 and screwing the nut 33 down on the receiving threads on the housing 6 to compress and lock the packing gland 30 into position. The nut 27 is screwed into the position to lock the nut 33 against unscrewing.

The upper radial bearing restrictor assembly is then assembled by first positioning the keys 20' in the receiving notch and positioning the sleeve 20 carrying the bars 23, so as it will engage the key 20'. The sleeve 16 and O rings 19 and the sleeve 18 are positioned in the housing 6. The housing 6 is then entered over the shaft with sleeve 18 sliding over the bars 23 and the packing gland 30 sliding over the sleeve 36 until the dogs 35 have entered the notches 26. The drive shaft cap 13 and the housing 5 and the rest of the tool are assembled in the conventional manner for such motors.

THE LUBRICATION SYSTEM

As will be noted the housing 6 is bored at the internal shoulder 32 with bore 56 sealed by plug 58 and bore 57 sealed by fitting 59 and bores 56', 59' and 60' sealed by suitable plugs.

With the bores 56', 59' and 60' open by the removal of the sealing plugs lubricant such as oil or a light grease is introduced through the fitting 59 to enter into the cavities around and through the bearing assembly down through the annulus 55 and through the bores 63 to fill the annulus between the sleeve 67 and the housing 7 which acts as a lubricant reservoir. The lubricant under pressure displaces the flexible bellows filling the entire reservoir and passes through the bores 65 and through the annulus 68 to fill the spaces above the seals 99'. The air is displaced through the open bores, and as the level of lubricant covers each bore and the lubricant escapes, the plugs are seated to close the bores. The tool is then completely filled with lubricant between the bottom of the packing gland 30 and the seals 96'. Other sequences of filling the tool with lubricant will be available from the arrangement of sealed bores as will be evident to those skilled in the art.

OPERATION OF THE IN-HOLE MOTOR DRILL ASSEMBLY

The drill string assembled with the motor and drill-bit is lowered into the bore-hole. The mud in the bore-hole will flow through the nozzles located in the bit and into the interior of the drive shaft, through the ports 14 into the housing 1. Since the positive displacement motor does not allow flow without rotating the rotor, a by-pass valve is installed on top of said motor. The by-pass valve is open when lowering the drill string 5, the mud in the bore-hole will fill the drill string above the by-pass valve thus minimizing the displacement of the mud in the bore-hole. This function of the by-pass valve is well known and need not be further described. This way, the pressure in the bore-hole and inside the drilling assembly is equalized during lowering.

As the drill string is lowered into the bore-hole, due to their weight, the rotor and the connecting rod, the drive shaft and bearing assemblies and the bit are displaced axially with respect to the housings. The dogs 35, being of sufficient length remain in the notch 26, space being provided for this function. Due to the sliding relationship of the bars 23 and the tungsten carbide sleeve 18 the lateral displacement occurs at this point with the bars 23 moving relatively downward as compared with the tungsten carbide sleeve 18. The sleeve 36 forming a sliding, moves downwardly in respect to the packing gland 30 sliding over the fibrous packing maintaining at all times a seal at the fibrous packing 31. Since the race 47 is positioned on top of the pin 52, no separation occurs with the dog 53 which remains in the notch 54. The weight of the shaft assembly is exerted through the pressure plate 50 compressing springs 52 for the distance required by the axial displacement of the shaft and housing and may even make a metal to metal contact as is shown in FIG. 3. The degree of compression permits the thrust load to be transmitted through the ball and race, to the pin 52 as the shaft 15 moves down with sleeve 102 sliding past sleeve 98, the seals 96 remain sealed against spacer 99. No load is therefore on the lower bearing assembly. (See FIG. 4) However, the Belleville springs do exert a residual compression to hold the races against the balls with the pressure plates against their seats.

It will be observed that as the tool enters through the body of mud in the bore-hole, mud will enter into the annular space 28. Mud will also enter into the interior of the bellows through the bore 77 and 76 and exert a pressure on the lubricant substantially equal to the static pressure of the column of mud in the annulus of the bore at the orifice 29. The hydraulic pressure across the packing gland is thus zero in practical effect. It will be observed that the lubricant pressure at the packing gland 30 wil be substantially equal to the hydrostatic pressure of the mud at the rotary bearing end, adjacent the bit box 104. The hydraulic pressure across the rotary bearing assembly 95 is in practical effect, zero. As has been explained above the lubrication assembly ensures that there be the zero pressure difference across the seals at all levels of pressure occurring in the environment when the tool is placed. This balanced pressure will be maintained regardless of loss of lubricant, or wear in the bearing assembly. If there is a leak of lubricant, the pressure in the lubricant passageways may drop below the pressure inside the bellow. The higher pressure in the ambient exterior annulus will expand the bellows forcing lubricant from the reservoir into the lubricant passageways to replenish the loss. This will continue until the bellows fills the reservoir spaces as is shown by the dotted lines. (FIG. 2A) Because of the large bearing load (weight on bit), the use of multiple bearing assemblies reduces the load on each ball bearing. In the illustration shown in FIGS. 2A and 2B each tandem bearing assembly takes one-third of the load transmitted from the housing through the pressure plate, the bearing assembly, onto the drive shaft and then to the bit. When the bit is on bottom and the desired drilling load is on the bit, the housing has moved downward with respect to the drive shaft and the load is off the upper bearing and has been transferred through the pressure plates and Belleville springs to the shaft and bit. (See FIGS. 2A and 2B) The springs 52 being in sufficient compression to hold the races in contact with the balls 49.

The Belleville springs creates a spring loaded suspension of the drive shaft, the connecting rod, and the rotor and bit and acts as a shock absorber to minimize the impact load on the bearings. This spring suspended mass is in a body of fluid and any vibration which is introduced causing a displacement or an acceleration of the drill rod relative to the housing will be dampened by the pumping action of the springs in the body of fluid. This will cause dampening out of the vibratory forces on the Belleville springs and act as shock absorbers and will reduce the pounding on the bearings and preserve their life.

Since the balls in all the bearing assemblies are always under some load, resulting in the races contacting the balls under some compressive force, there is no separation of the races, balls or pressure plates under oscillations of the drive shaft. The destructive force countered in the prior art bearings and like in combinations in drilling assembly in in-hole motors will not be encountered in my invention described above. When drilling is in progress the mud is pumped down through the drill string 1, and the mud pressure will then cause the by-pass valve to close and pass through the stator 4 causing the rotation of the rotor 9. This rotation is transmitted through the connecting rod 10 to the drive shaft 15 and then to the drill-bit which is mounted on the drill-bit box 104. The mud which is passed out of the stator 4 and around the connecting rod 10 is introduced through the orifices 14 and into the hollow tubular drill shaft 15 and through the nozzles of the drill-bit into the bore-hole to be returned to the surface. The hydraulic forces which are exerted have been discussed above.

During drilling the vent-hole 29 together with the bellows maintain a zero differential pressure across the packing gland 30.

Since the hydraulic pressure at the annulus 21 exit from the stator and by the mud in the bore-hole at the vent 29 and the radial bearing assembly may be of the order of 500 to 1000 pounds per square inch more or less, provision is made to restrict the escape of mud issuing from the stator through the bore 29. This is required so that the pressure and quantity of mud passing through the nozzles of the bit is not depleted below that required to move the detritus to the surface. The torque required at the bit determines, for a given motor the gallons per minute to be passed through the stator and the pressure difference across the stator. The nature of the drill-bit nozzles and the length of the column of mud and its density establishes the pressure required across the bit nozzles. These considerations are of importance in establishing the tolerable amount of bypass through the vent orifice 29.

The provision of the flow restrictor rotary bearing assembly functions of my invention acts to limit the flow of mud from the annulus 21 to the vent orifice 29 and to introduce sufficient fluid frictional loss in the fluid passageways 24 so that the pressure at the annulus 28 and the bore 29 be substantially the same as the bore-hole annulus adjacent 29. The pressure in the annulus 28 should, however, be sufficiently higher than the bore-hole annulus pressure so that some flow occurs through the annular spaces 24 to be sure that they are not clogged with mud particles. A further advantage of the structure of my invention in connection with the rotary bearings 18 and 23 and 98' and 102 results from the use of metal which is harder than the particles that may be encountered in the mud. They are wear resistant and will resist abrasion or scratching by mud particles including the sand should any enter between the wear surfaces due to some unavoidable tolerances of fit which will permit the intrusion of the mud. Furthermore, due to the fact that the tungsten carbide or other similar material has a hardness much greater than the materials present in mud, any material which by accident gets in between the surfaces will be ground to such fine particle size as to have no material effect upon the bearing surfaces and will discharge with the mud.

I claim:

1. A fluid motor, comprising a stator, a rotor in said stator, a tubular drive shaft connected to said rotor, a housing for said drive shaft, a port in said tubular drive shaft, a first fluid passageway into the stator, an outlet from said stator connected to the interior of said tubular drive shaft through said port, a discharge opening from said shaft, a lubrication reservoir chamber in said housing between said outlet and said discharge opening, a bearing between said shaft and said housing lubrication passageways in said housing connecting said reservoir chamber and the interior of said housing at said bearing, a seal mounted in sealing relation between said housing and said shaft, said seal positioned in said housing between said stator outlet and said bearing, a second fluid passageway being positioned in said housing, one end of said seal communicating with said stator outlet through said second fluid passageway means to maintain the pressure in said reservoir and at said seal, in the passageway between stator outlet and said seal, and at said discharge opening substantially equal.

2. The motor of claim 1, said bearing being a thrust bearing assembly mounted on said housing and on said shaft in thrust load transmission relationship between said shaft and said housing.

3. The motor of claim 2, a second seal positioned adjacent the end of the housing adjacent said shaft discharge in sealing relation between said shaft and said housing, a second bearing assembly spaced from such first-mentioned bearing assembly and mounted on said shaft and on said housing in thrust load transmission relationship between said housing and said shaft, said second bearing being positioned in said housing between the said reservoir and the said second seal, lubricating passageways between said reservoir and the housing at said second thrust bearing.

4. The fluid motor of claim 1, said means including a bore positioned in said housing adjacent said second fluid passageway, a bellows mounted in said reservoir chamber, a passageway through said housing in communication with the interior of said bellows.

5. The motor of claim 4, said bearing being a thrust bearing assembly mounted on said housing and on said shaft in thrust load transmission relationship from said shaft to said housing.

6. The motor of claim 5, a second seal positioned adjacent the end of the housing adjacent said shaft discharge in sealing relation between said shaft and said housing, a second bearing assembly spaced from such first-mentioned bearing assembly and mounted on said shaft and on said housing in thrust load transmission relation between said housing and said shaft, said second bearing being positioned in said housing between the said reservoir and the said second seal, lubricating passageways between said reservoir and the housing at said second thrust bearing.

7. The motor of claim 1, said second fluid passageway being a restricted passageway.

8. In the motor of claim 1, said bearing being a thrust bearing assembly mounted on said housing and on said shaft in thrust load transmission relationship from said shaft to said housing.

9. The motor of claim 8, a second seal positioned adjacent the end of the housing adjacent said shaft discharge in sealing relation between said shaft and said housing, a second bearing assembly spaced from such first-mentioned bearing assembly and mounted on said shaft and on said housing in thrust load transmission relationship between said housing and said shaft, said second bearing being positioned in said housing between the said reservoir and the said second seal, lubricating passageways between said reservoir and the housing at said second thrust bearing.

10. The fluid motor of claim 7, said means including a bore positioned in said housing adjacent said second fluid passageway and the exterior of said housing, a bellows mounted in said reservoir chamber, a passageway through said housing in communication with the interior of said bellows.

11. The motor of claim 10, said bearing being a thrust bearing assembly mounted on said housing and on said shaft in thrust load transmission relationship from said shaft to said housing.

12. The motor of claim 11, a second seal positioned adjacent the end of the housing adjacent said shaft discharge in sealing relation between said shaft and said housing, a second bearing assembly spaced from such first-mentioned bearing assembly and mounted on said shaft and on said housing in thrust load transmission relation between said housing and said shaft, said second bearing being positioned in said housing between the said reservoir and the said second seal, lubricating passageways between said reservoir and the housing at said second thrust bearing.

* * * * *